United States Patent
Payne

(10) Patent No.: US 6,779,398 B2
(45) Date of Patent: Aug. 24, 2004

(54) ULLAGE METER FOR A TANK OF COMPRESSED GAS AT ELEVATED TEMPERATURE

(76) Inventor: Walter Benjamin Payne, 4533 Mac Arthur Blvd. #539, Newport Beach, CA (US) 92660

( * ) Notice: Subject to any disclaimer, the term of this patent is extended or adjusted under 35 U.S.C. 154(b) by 0 days.

(21) Appl. No.: 09/900,188

(22) Filed: Jul. 9, 2001

(65) Prior Publication Data

US 2003/0005762 A1 Jan. 9, 2003

(51) Int. Cl.⁷ .......................... G01F 23/00; G01F 23/14
(52) U.S. Cl. ........................................ 73/295; 73/290 B
(58) Field of Search ............................... 73/295, 290 B, 73/290 R

(56) References Cited

U.S. PATENT DOCUMENTS 3,585,381 A * 6/1971 Hodson et al. ............... 349/21
4,859,360 A * 8/1989 Suzuki et al. ............ 252/299.7
6,260,414 B1 * 7/2001 Brown et al. ................. 73/295

FOREIGN PATENT DOCUMENTS

JP 2001090899 A * 4/2001 ........... F17C/13/02

* cited by examiner

Primary Examiner—Hezron Williams
Assistant Examiner—Rodney Frank
(74) Attorney, Agent, or Firm—Frank C. Price

(57) ABSTRACT

A method of gas tank ullage indication is designed to be made up of a coating or film attached to the surface of a tank for holding compressed gas. This is used normally when the tank is warm as is the case right after the tank is pressured with gas. The coating includes materials which change in appearance when various specific temperatures are reached. The changed appearance allows indications to be seen that tell the observer how the pressure will change after the tank has equilibrated to some specific temperature.

7 Claims, 3 Drawing Sheets

| $P_{AF}$ | $T_E$ | 95 °F | 110 °F | 120 °F |
|---|---|---|---|---|
| 3000 | 65 °F | 133 | 241 | |
| 3000 | 75 °F | 109 | 187 | |
| 3500 | 65 °F | 155 | 281 | |
| 3500 | 75 °F | 127 | 218 | |
| — | 65 °F | 4.4 % | 8.0 % | |
| — | 75 °F | 3.6 % | 6.2 % | |

ULLAGE METER FOR A TANK OF COMPRESSED GAS AT ELEVATED TEMPERATURE

CROSS REFERENCE TO RELATED APPLICATIONS

Paron, et al. U.S. Pat. No. 5,738,442

Santacaterina, et al. U.S. Pat. No. 4,779,995

STATEMENT REGARDING FEDERAL SPONSORSHIP n.a.

REFERENCE TO A MICROFICHE APPENDIX n.a.

BACKGROUND OF THE INVENTION

The available dive time for a SCUBA diver is a function of his compressed air supply. A freshly pressured tank usually has elevated temperature due to the heat generated by the compressor, if one is used, or due to the heat picked up as gas expands out of a high pressure storage tank and compresses into the SCUBA tank. As a warm, filled tank equilibrates with cooler ambient air or water, the pressure drops. This amounts to an ullage in the freshly filled tank. This ullage represents a concomitant loss in available dive time compared to that of the same tank filled to capacity with temperature-equilibrated air.

Divers use their compressed air tank pressure to predict how long they can stay down. Normally, a diver desires a maximum dive time—a maximum pressure at the start of a program of diving. Also, at the time a tank is filled, the diver would like to know how much air he actually will have after the tank temperature finally equilibrates A tank filled to capacity with warm air will have less useful air than might be indicated by full pressure before the tank cools off.

Any prediction of ullage for a freshly filled tank must be based on a temperature measurement of the freshly filled tank. Santacaterina (U.S. Pat. No. 4,779,995) has invented a system of color temperature strips. His patent lists sixteen other related patents. Paron (U.S. Pat. No. 5,738,442) has invented a temperature indicator for a wine bottle based on art similar to that of Santacaterina. Neither pressure nor ullage is related to these patents. Yet, these patents use the kind of temperature sensitive material that might be used in the present concept. The material changes color at a particular temperature depending upon the design of its makeup.

Teletemp company of Fullerton, California makes one type of temperature indicator which can be used in the present invention. Liquid crystals are formulated for a specific temperature response. In the response reflected light is modified to allow a message such as a specific pressure to be seen. Unless the temperature is within the designed range of the liquid crystal material, the indication is black. The adhesive-backed liquid crystals have been used to indicate body temperature, as refrigerator thermometers and as hot warning labels to name a few.

BRIEF SUMMARY OF THE INVENTION

Gas storage tank cooling after filling and the prediction of the future air supply from a cooling tank has been a problem without solution for divers in spite of the great expansion of SCUBA sport over the past forty years. The diver has no real use for the tank temperature. What he really needs is a method to provide an indication of what the supply of air will be from the warm tank supply after the tank has cooled. The diver knows his tank and it's capacity in terms of minutes of diving—if it is completely filled at the start of a dive with temperature-equilibrated air. The method of this invention tells the change in pressure to expect when the tank temperature equilibrates. With this invention indicators on the tank surface that are actuated by the tank wall temperature do this. Change in color due to a particular temperature allows a particular ullage number to be seen. The ullage number is pre-calculated based on the gas law of temperature effect on pressure at constant volume. Each ullage number is based on one hypothetical final gas temperature or a variety of segments can be used, each not only based on a given temperature immediately after filling, but also each based on an expected equilibrated final temperature.

DETAILED DESCRIPTION OF THE INVENTION

Figure 1:
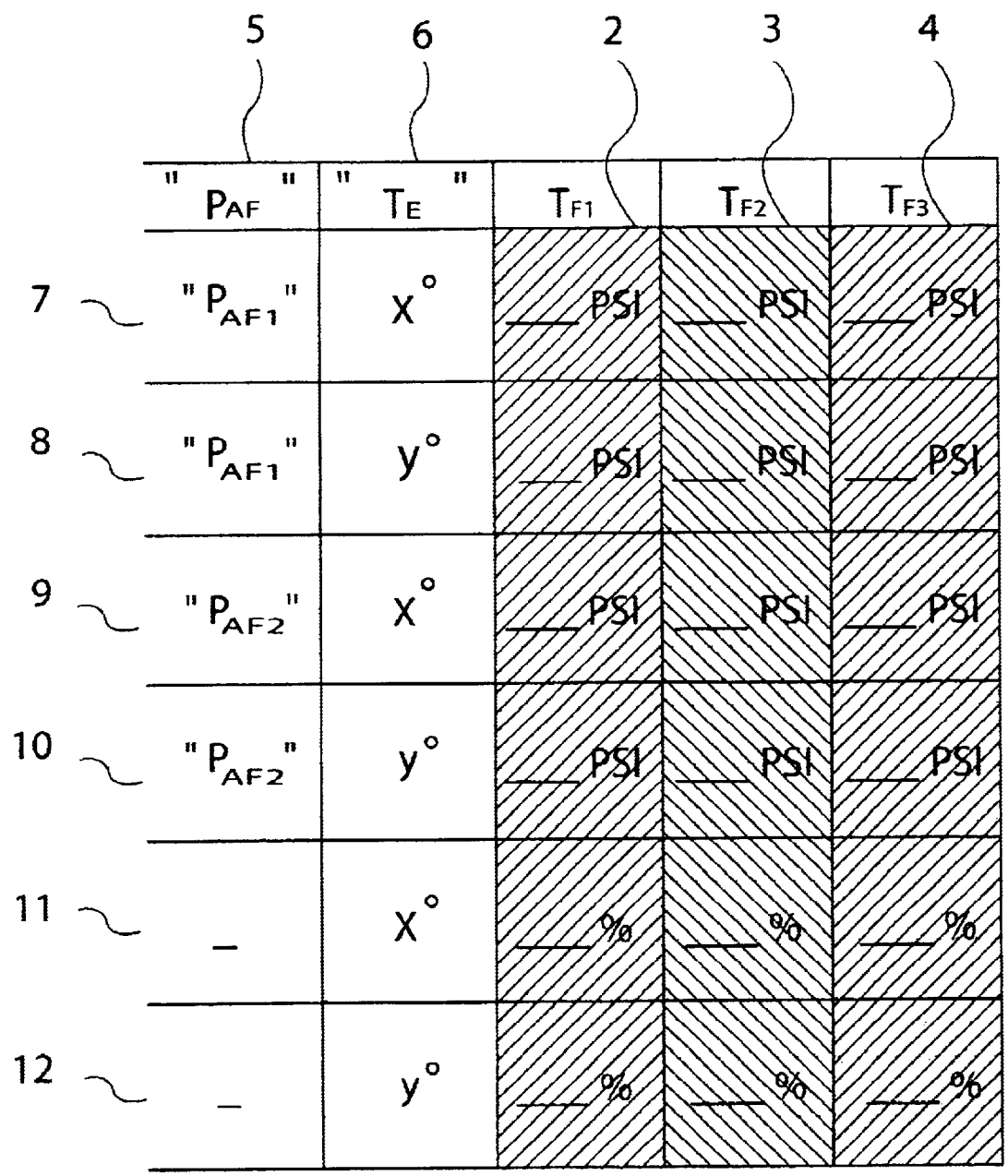
FIG. 1 is a general case of an ullage meter showing a printed label for a gas storage tank with an assortment of ullage indicators each dependent upon a (1) different combinations of pressure and temperature after fill and (2) an equilibrium temperature to which the tank will have cooled some time after fill.

In FIG. 1 can be seen a coating 1, either painted on the tank or attached as a paper-thin film, for a pressurized gas tank. The coating is in the form of a table of conditions for a pressure tank holding gas. In detail the coating 1 is made up of an assortment of distinct areas in columns 2, 3 and 4 wherein the background of each column is made up of a different material, each sensitive to a different temperature. While any variety and range of activation temperatures is possible within a design of coating, in this representative case each of the columns 2, 3, and 4 are cross hatched differently to represent, within each column, materials of the same temperature sensitivity within a column and with different materials in each column. When the specific activation temperature (TF1 or TF2 or TF3) of a given column is reached, the material changes color so as to illuminate the numbers for the column. The change can be from black to a lighter shade which allows the numbers to be seen or it might be from a particular color to a colorless, clear presentation. The change in color might persist over a relatively small range of temperature or it might persist at any temperature above a certain level. The nature of the numbers showing after activation is noted, as pressure (psi) or percent of original pressure, on each of the squares of the three columns. Columns 5 and 6 have fixed, visible numbers defining the associated final equilibrium temperatures and initial pressures upon filling.

Imprinted within the coating 1 in the second column from the left, 5, are, for example, two different equilibrium temperatures, one to be selected by the reader of the coating to represent the expected final, equilibrium temperature of the filled gas tank. Column 6 specifies for rows 7, 8, 9, and 10 the tank pressure immediately after fill is complete. The numbers of columns 5 and 6 are always visible. Rows 11 and 12 have no pressure after fill and they indicate, upon the temperature activation, the percentage drop to be expected in whatever the final fill pressure is, the drop being fully realized as the warm, filled tank reaches the lower equilibrium temperature.

In the example of FIG. 1 the temperature sensitive material of all of the areas in the column 2 react at the same temperature. The column 3 and the column 4 areas have two other distinct temperatures of activation.

The numbers for each of the many areas of columns 2, 3, and 4 are calculated using the classic gas law with inputs of absolute temperatures (both temperature after fill, TF1 and equlibrium temperature, TE) and absolute pressure and output of pressure as psi or percent, volume being constant in all cases. In the cases of rows 11 and 12, one minus the ratio of equilibrium temperature degrees absolute, to the temperature after fill, degrees absolute, gives the fractional drop in fill pressure to be expected. While the temperature after fill is the basic activator to highlight the "pressure drop" or the "percentage drop" in a particular row, the temperatures are not the key information, it is the pressure effect and this is literally spelled out in a particular area either as psi drop or percentage drop in pressure.

In summary, FIG. 1 shows a table to be imprinted upon a gas container to show for various initial pressures (or for any initial fill pressure in the last two rows) and final, equilibrium temperatures, the pressure loss from the initial filled pressure for three cases of tank temperature at the time the filling is complete.

This method can be expanded beyond the example of FIG. 1. Any number of columns in addition to 2, 3, and 4 for different temperatures can be used; any variety of combinations of pressure and temperature immediately after fill and of final equilibrium temperature can be used. In some cases for the temperature sensitive indicator a particular activation temperature might not be available. Then, the nearest one would be used and the proper pressure drop or percentage change would be calculated and imprinted on the given area.

Figure 2:
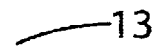
FIG. 2 is one example of a specific set of conditions for the design of FIG. 1, the tank ullage meter being observed right after the fill.

FIG. 2 illustrates the case of FIG. 1 where the tank has a temperature of 110 degrees F. or higher. The numbers for 110 degrees have become visible, as have those for 95 degrees. To define the temperature more precisely there would have to be additional columns to register for temperatures between 110 degrees and 120 degrees.

Figure 3:
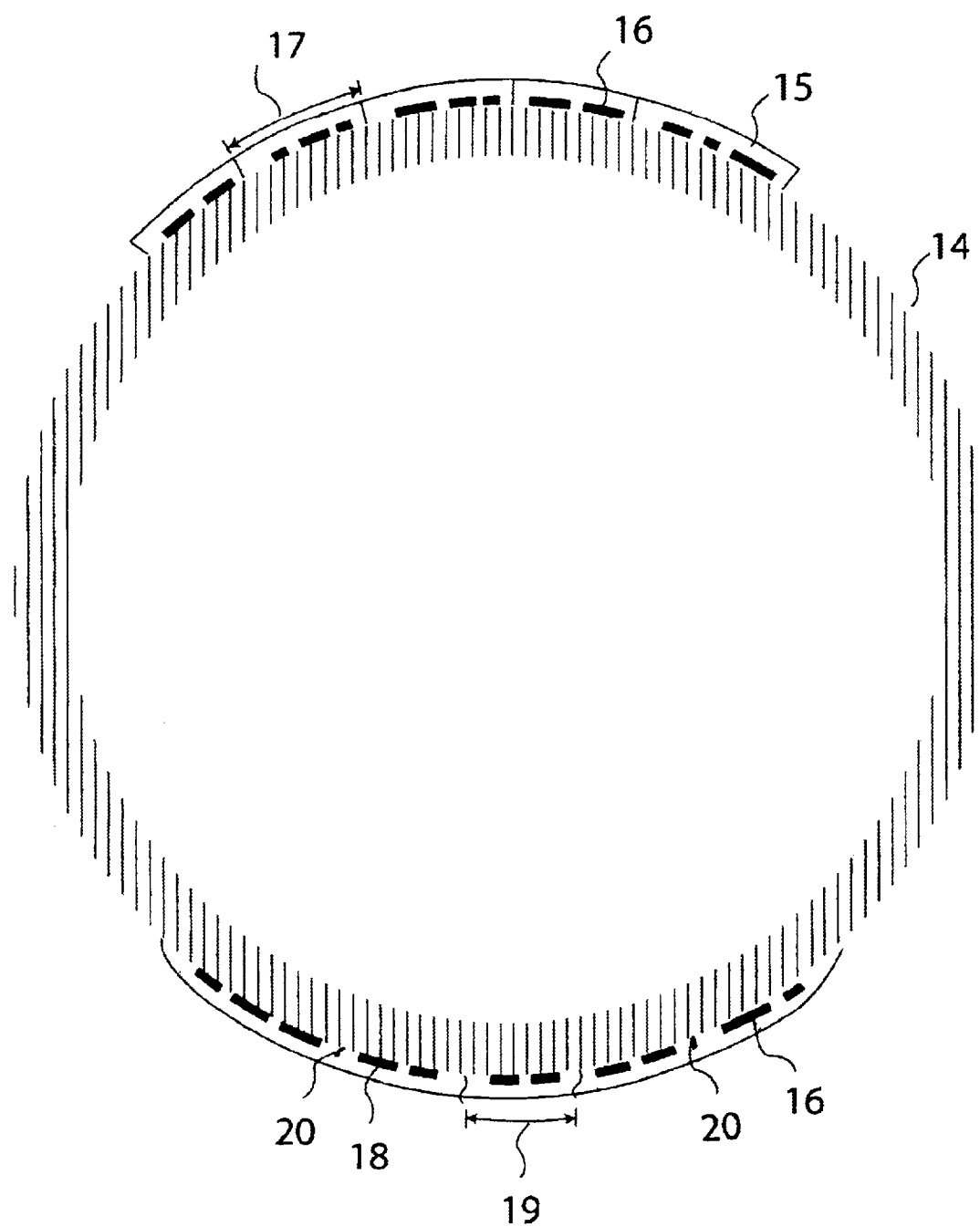
FIG. 3 is a cross section view of a gas storage tank illustrating the application of the temperature sensitive elements, containing indications, to the tank surface.

In FIG. 3 can be seen a storage tank wall 14 with two types of color-changing coating 15 and 16 applied to the tank external surface. Imbedded in the film coatings 15 can be seen the cross sections of printed indications, 16, each defining future tank ullage when the temperature sensitive film of a particular area 17, for example, is activated by the tank temperature. The same is true of indications 18 on the tank wall 14, the indications each being painted over by a paint 19 that is activated by a particular tank wall temperature. The marks 20 denote the boundaries between two paints of different temperature sensitivities.

The invention is not limited to the particular cases seen in the figures. Any method using temperature sensitive materials applied to the surface of a gas storage tank to indicate the effect of temperature change of the tank on the pressure would be covered by this invention.

I claim:

1. A method of gas tank ullage determination using temperature sensitive pigments, comprising, said temperature-sensitive pigments within color changing coatings applied to the outer surface of the wall of a gas storage tank, said coatings when changing color allowing indications imprinted within said coatings to be read, said indications defining for a given future temperature the change in pressure of gas stored within the tank as determined by design calculations using the physical principles of the common gas laws.

2. The method of claim 1 in which the coating is painted on said container.

3. The method of claim 1 in which the coating is a film applied to the surface of said container.

4. The method of claim 1 in which said distinct areas are organized in groups, each group corresponding to a predetermined final temperature for the tank.

5. The method of claim 1 in which indications represent the amount of gas that would be available compared to that of a filled, equilibrated tank at the same pressure.

6. The method of claim 1 in which the indicating numbers are units of pressure to which a tank will change upon equilibrating to a particular temperature.

7. The method of claim 1 in which said coatings are formed in distinct areas, each area sensitive to a particular color-changing temperature while said particular temperature prevails, each area having a number imprinted within it, said number being made visible by said color-changing.

* * * * *